(12) United States Patent
Collins et al.

(10) Patent No.: US 11,290,403 B2
(45) Date of Patent: Mar. 29, 2022

(54) AUTOMATICALLY GENERATED PERSONALIZED MESSAGE

(71) Applicant: Snap Inc., Santa Monica, CA (US)

(72) Inventors: Alexander Collins, Santa Monica, CA (US); Benedict Copping, Los Angeles, CA (US); Justin Huang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 157 days.

(21) Appl. No.: 16/849,095

(22) Filed: Apr. 15, 2020

(65) Prior Publication Data
US 2021/0328955 A1 Oct. 21, 2021

(51) Int. Cl.
*G06F 15/16* (2006.01)
*H04L 51/10* (2022.01)
(Continued)

(52) U.S. Cl.
CPC .......... *H04L 51/10* (2013.01); *G06F 16/2282* (2019.01); *G06Q 10/10* (2013.01);
(Continued)

(58) Field of Classification Search
CPC ..... H04L 51/10; H04L 51/32; G06F 16/2282; G06Q 10/10; G06Q 50/01; G06Q 50/265;
(Continued)

(56) References Cited

U.S. PATENT DOCUMENTS

| 2013/0159445 A1* | 6/2013 | Zonka .................... G06Q 30/06 709/206 |
| 2017/0004126 A1 | 1/2017 | Li et al. |
| 2019/0073369 A1 | 3/2019 | Soon-Shiong |

FOREIGN PATENT DOCUMENTS

| KR | 20050082098 | 8/2005 |
| WO | 2011100246 | 8/2011 |
| WO | 2016057135 | 4/2016 |

OTHER PUBLICATIONS

"International Application Serial No. PCT/US2021/027493, International Search Report dated Aug. 6, 2021", 7 pgs.
(Continued)

*Primary Examiner* — Razu A Miah
*Assistant Examiner* — Joseph R Maniwang
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for performing operations comprising: identifying a current social event; obtaining a list of creative tools associated with the current social event; accessing a plurality of content items generated by a client device; determining that one or more of the creative tools have been applied to a first content item in the plurality of content items; generating a subset of content items corresponding to the current social event that includes the first content item; automatically populating a social event template graphic based on the subset of content items corresponding to the current social event to generate a social event graphic card; and receiving a request from the client device to transmit the social event graphic card to one or more other client devices.

20 Claims, 11 Drawing Sheets

(51) Int. Cl.
  *G06F 16/22* (2019.01)
  *G06Q 10/10* (2012.01)
  *G06Q 50/00* (2012.01)
  *G06T 11/60* (2006.01)
  *H04L 51/52* (2022.01)
  *G06Q 50/26* (2012.01)

(52) U.S. Cl.
  CPC ........... *G06Q 50/01* (2013.01); *G06Q 50/265* (2013.01); *G06T 11/60* (2013.01); *H04L 51/32* (2013.01); *G06T 2200/16* (2013.01); *G06T 2200/24* (2013.01)

(58) Field of Classification Search
  CPC .. G06T 11/60; G06T 2200/16; G06T 2200/24
  See application file for complete search history.

(56) References Cited

OTHER PUBLICATIONS

"International Application Serial No. PCT/US2021/027493, Written Opinion dated Aug. 6, 2021", 6 pgs.

\* cited by examiner

AUTOMATICALLY GENERATED PERSONALIZED MESSAGE

TECHNICAL FIELD

The present disclosure relates generally to events and, more particularly, to generating content related to events.

BACKGROUND

Social network platforms continue to grow globally. Users of these platforms constantly seek new ways to connect with their friends across the globe.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
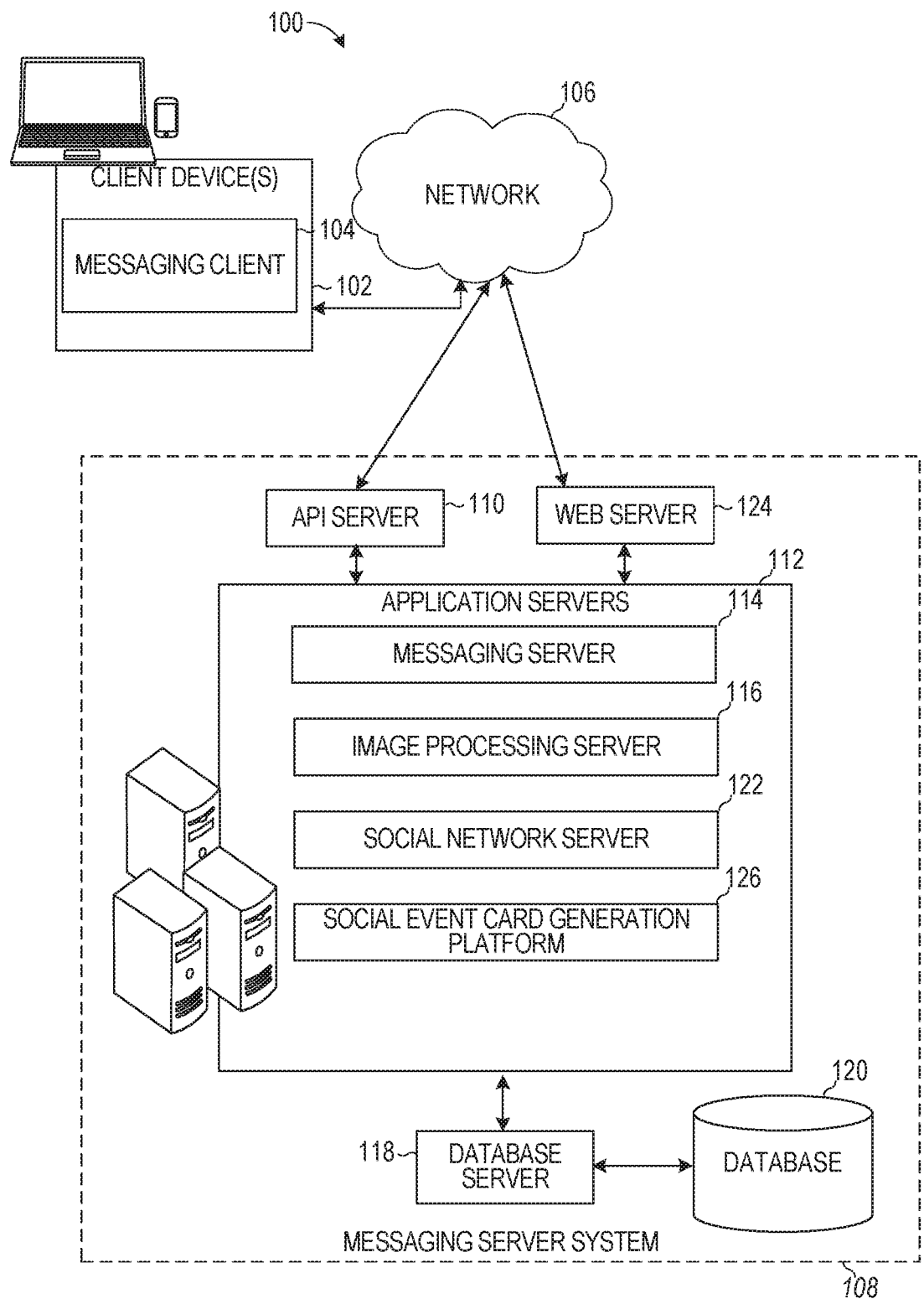
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

One of the challenges users experience when they try to connect with each other in relation to a shared event is choosing the right content to share. For example, a given user may desire to send an electronic greeting card in relation to the Christmas holiday to the user's friends. To do so, the user has to manually search through a tremendous amount of pictures and content the user has created to add to the greeting card. The user also has to spend time finding the right design and arrangement of the content in the greeting card after selecting the pictures to include in the greeting card. This approach is very time consuming, not intuitive, and difficult, which ends up frustrating users. As a result, users avoid generating and sharing content in relation to a shared event and miss out on special opportunities to connect with their friends. Some systems automatically select content at random for a user to view and share, but such systems fail to consider the content in relation to an event or location. Such approaches reduce the significance of the content that is selected and also end up providing a collection of content that is not unique or meaningfully different among users. This results in such features going unused and can disrupt the overall user experience, which ends up wasting system resources, such as storage, processing, and display resources.

The disclosed embodiments improve the efficiency of using an electronic device by automatically generating holiday cards, such as greeting cards, that are unique and meaningful to users and that can be easily shared with other users. Specifically, the disclosed embodiments identify a current social event and obtain a list of creative tools associated with the current social event. A plurality of content items generated by a client device is identified and a determination is made as to whether one or more of the creative tools have been applied to a first content item in the plurality of content items. A subset of content items corresponding to the current social event is generated that includes the first content item, and a social event template graphic is automatically populated based on the subset of content items corresponding to the current social event. A request is received from the client device to transmit a social event graphic card based on the populated template to one or more other client devices. In this way, meaningful and unique holiday greeting cards are automatically generated with minimal user interaction, which allows users to easily connect with their friends in relation to an event, such as a holiday celebrated worldwide, an event celebrated worldwide, an event celebrated in a particular region, a religious holiday, a national state of emergency, a quarantine order in the particular region, or a secular holiday.

This significantly improves how users interact, connect with each other, and exchange messages on a social media platform. Particularly, this significantly improves the user experience, reduces the number of steps a user has to perform to generate content related to a shared event, and makes interacting with friends and using the social media platform more enjoyable. This is because the user can receive an automatically generated holiday greeting card without actually searching for content, manually selecting content, manually organizing the content, and opening up different interfaces to generate a greeting card.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

Each messaging client 104 is also able to communicate with social event card generation platform 126. Social event card generation platform 126 identifies a current social event and obtains a list of creative tools associated with the current social event. Social event card generation platform 126 identifies a plurality of content items generated by a client device and determines that one or more of the creative tools have been applied to a first content item in the plurality of content items. Social event card generation platform 126 generates a subset of content items corresponding to the current social event that includes the first content item and automatically populates a social event template graphic based on the subset of content items corresponding to the current social event to generate a holiday card. The social event card generation platform 126 presents an identifier of the holiday card on the messaging client 104. In response to receiving a user selection of the identifier, the social event card generation platform 126 transmits the holiday card to one or more other client devices, such as client devices of friends of the user of the messaging client 104.

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112, including social event card generation platform 126. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, social event card generation platform 126, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
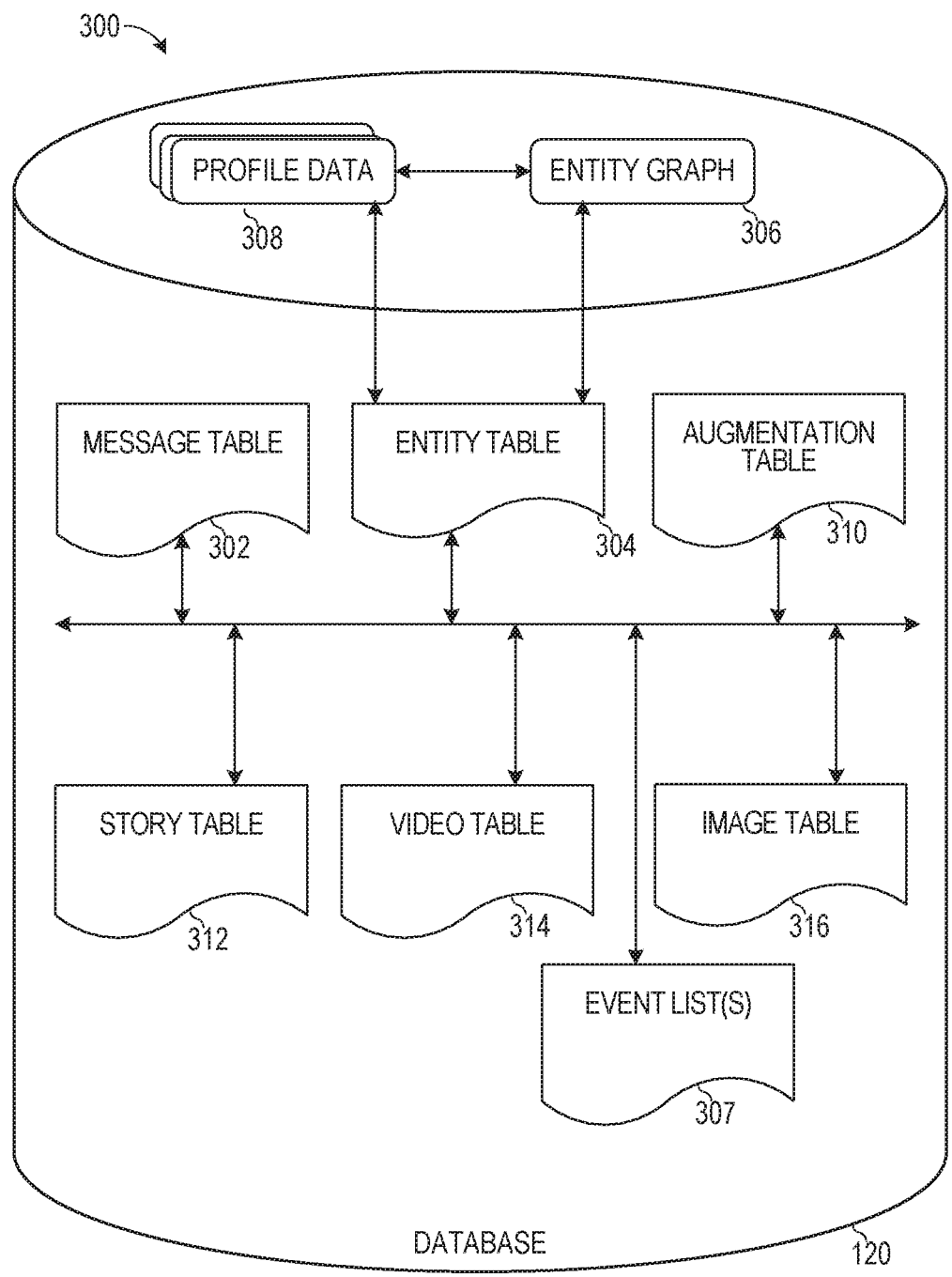
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
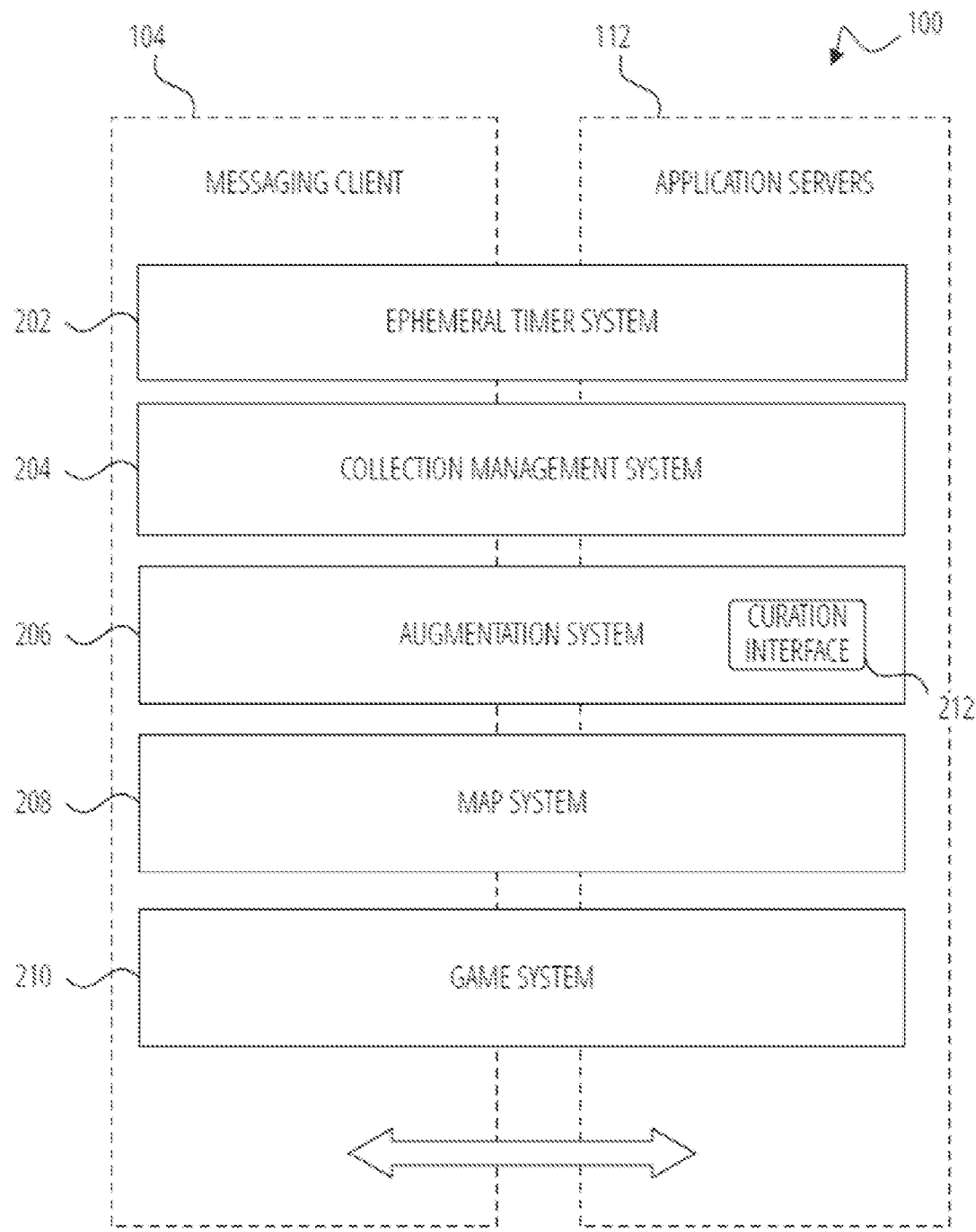
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client side by the messaging client 104 and on the sever side by the application servers 112. These subsystems include, for example, an ephemeral timer system 202, a collection management system 204, an augmentation system 206, a map system 208, and a game system 210. In some implementations, augmentation system 206 implements some or all of the functionality of the social event card generation platform 126.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items)

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

Event list(s) 307 stores data representing various events of the social event card generation platform 126. Event list(s) 307 provide the starting time and date data of each event, which the social event card generation platform 126 uses to automatically generate a social event template graphic (e.g., a holiday greeting card) corresponding to a given one of the events before or after the beginning of the given event. Each event in the event list(s) 307 may include a threshold period of time that is used to control how long after the event begins or ends the social event template graphic remains available to select and share with other users. For example, event list(s) 307 stores a first event (e.g., New Year's Day) with corresponding start time (e.g., midnight) and date (e.g., every January 1 of a given year) and a threshold of three days. In such cases, any automatically generated social event template graphic corresponding to the first event can be made available on a messaging client 104 to share with other users for a period of three days after the start or end of the first event. After the threshold period of three days, an identifier of the social event template graphic corresponding to the first event is removed to prevent the social event template graphic from being selected to be shared with other users.

As another example, event list(s) 307 stores a second event (e.g., Christmas) with corresponding start time (e.g., midnight) and date (e.g., December 25 of a given year). As another example, event list(s) 307 stores a third event, Hanukah) with corresponding start time (e.g., sunset time on a day previous to the start date of the event) and start date (e.g., a specified lunar day of a given year which varies in the Gregorian calendar from one year to the next). As another example, event list(s) 307 stores a fourth event start or end of a national state of emergency) with corresponding start date (e.g., the day the national state of emergency is declared as starting or ending). As another example, event list(s) 307 stores a fifth event (e.g., start of a quarantine order) with corresponding start date (e.g., the day the quarantine order begins) and with a specified region associated with the quarantine order (e.g., the cities, zip codes, states, or locations that are specified in the quarantine order). The fifth event may be associated with a predetermined time interval that specifies how long after the quarantine order starts to initiate the automatic generation of the social event template graphic. For example, the predetermined time interval is 30 days, in which case, when the current date is 30 days or more after the start of the quarantine order, the social event template graphic is automatically populated and made available to share with other users for another predetermined period of time.

Event list(s) 307 stores any number of events with their corresponding start times and dates including any a holiday celebrated worldwide, an event celebrated worldwide, an event celebrated in a particular region, Easter, Good Friday, Hanukkah, a religious holiday, a national state of emergency, a quarantine order in the particular region, or a secular holiday. In an embodiment, a user can input an event into the event list(s) 307 by manually specifying a name for the event, a visual attribute of the event (used to generate the social event template graphic), a start time, or a start date for the event. In some embodiments, the start times of the events stored in the event list(s) 307 are with respect to the Coordinated Universal Time (UTC) (e.g., the start times indicate the start time of the event in the UTC time having a zero offset).

Event list(s) 307 stores a set of creative tools that are associated with each event. For example, a first set of creative tools that are available for modifying one or more content items generated by the messaging client 104 is associated with the first event that is stored in the event list(s) 307. Such creative tools include any image or video modification features that can be applied to augment or modify an image or video before storing or sharing the image or video. Such creative tools include augmented reality graphics or items, annotations, captions, filters, and so forth. The first set of creative tools include features that are specific to the first event, such as captions, graphics, or words that describe the first event. As another example, a second set of creative tools that are available for modifying one or more content items generated by the messaging client 104 is associated with the second event that is stored in the event list(s) 307. The second set of creative tools include features that are specific to the second event, such as captions, graphics, or words that describe the second event a caption with the name of the event or a symbol of the event, such as a turkey on a Thanksgiving holiday).

Event list(s) 307 stores a minimum number of content items modified with creative tools in association with each event. For example, the first event in the event list(s) 307 is associated with a minimum number of three content items and a second event is associated with a minimum number of six content items. The minimum number of content items is used to conditionally control whether a social event template graphic is automatically generated for a given client device. For example, if the given client device has previously generated a set of content items to which only two creative tools associated with the first event were applied (e.g., a number of content items that is less than the minimum number associated with the first event), the social event template graphic associated with the first event is not automatically generated. If the given client device has previously generated a set of content items to which only ten creative tools associated with the second event were applied (e.g., a number of content items that is more than the minimum number associated with the second event), the social event template graphic associated with the second event is automatically generated.

The minimum number of content items associated with each event is dynamically adjusted based on popularity of the event, previous engagement patterns of users during the time of the event, an engagement level of a user with the messaging client 104, importance of the event, and so forth. In some cases, the minimum number associated with the first event is larger than the minimum number associated with the second event when the first event is more popular than the second event. In some cases, the minimum number associated with the first event is smaller than the minimum number associated with the second event when the first event is more popular than the second event. In some cases, the minimum number associated with the first event is larger than the minimum number associated with the second event when a greater percentage of users created content during the first event than the second event. In some cases, the minimum number associated with the first event is smaller than the minimum number associated with the second event when a greater percentage of users created content during the first event than the second event. In some cases, the minimum number associated with the first event is larger than the minimum number associated with the second event when the engagement level of the user with the messaging client 104 is greater than a threshold. In some cases, the minimum number associated with the first event is smaller than the minimum number associated with the second event when the engagement level of the user with the messaging client 104 is greater than a threshold.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of objects' elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
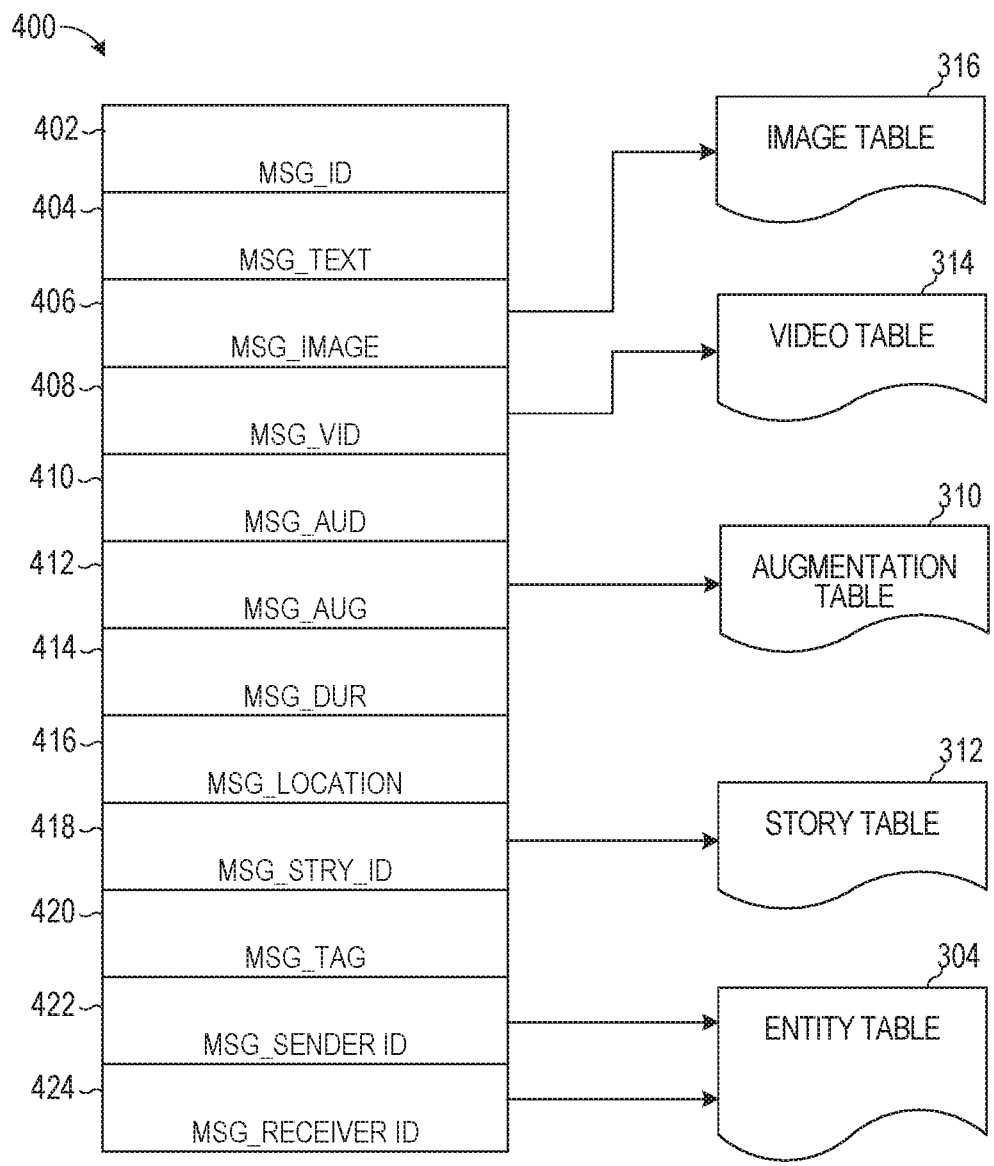
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

message identifier 402: a unique identifier that identifies the message 400.
  message text payload 404: text, to be generated by a user via a user interface of the client device 102, and that is included in the message 400.
  message image payload 406: image data, captured by a camera component of a client device 102 or retrieved from a memory component of a client device 102, and that is included in the message 400. Image data for a sent or received message 400 may be stored in the image table 316.
  message video payload 408: video data, captured by a camera component or retrieved from a memory component of the client device 102, and that is included in the message 400. Video data for a sent or received message 400 may be stored in the video table 314.
  message audio payload 410: audio data, captured by a microphone or retrieved from a memory component of the client device 102, and that is included in the message 400,
  message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
  message duration parameter 414: parameter value indicating, in seconds, the amount of time for which content of the message (e.g., the message image payload 406, message video payload 408, message audio payload 410) is to be presented or made accessible to a user via the messaging client 104.
  message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
  message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.
  message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
  message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentation data 412 may point to data stored in an augmentation table 310, values stored within the message story identifier 418 may point to data stored in a story table 312, and values stored within the message sender identifier 422 and the message receiver identifier 424 may point to user records stored within an entity table 304.

Figure 5A:
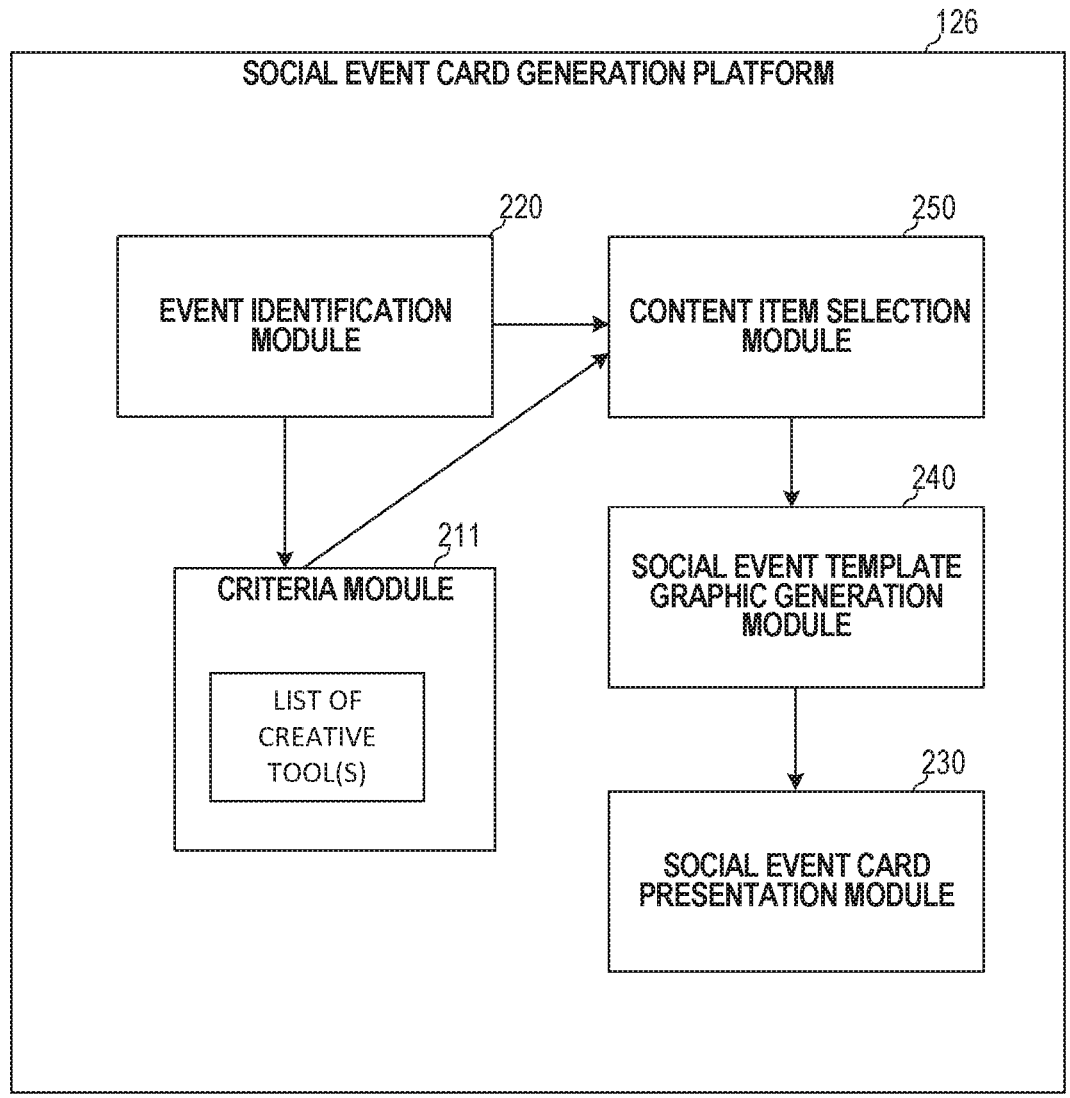
FIG. 5A is a block diagram showing an example social event card generation platform, according to example embodiments.

FIG. 5A is a block diagram showing an example social event card generation platform 126, according to example embodiments. Social event card generation platform 126 includes a criteria module 211, an event identification module 220, a content item selection module 250, a social event template graphic generation module 240, and social event card presentation module 230.

Event identification module 220 compares the start time or date of the events stored in event list(s) 307 to the current time and to the current geographical location. When the event identification module 220 determines that the current time or date in a given region matches the start time or date of a given one of the events in the list(s) 307, the event identification module 220 initiates a process to generate a social event template graphic by communicating an identifier of the given event to criteria module 211, content item selection module 250, and social event template graphic generation module 240. The event identification module 220 may perform this comparison for each geographical region and for each event in the list(s) 307 in specified time intervals (e.g., every 5 minutes) or in real time (e.g., continuously).

In some embodiments, the event identification module 220 retrieves a first event from the event list(s) 307. The event identification module 220 determines a geographical region associated with the first event. The event identification module 220 compares the current geographical region of a client device 102 with the geographical region associated with the first event. When the event identification module 220 determines that the current geographical region of the client device 102 is within a predetermined range of the geographical region associated with the first event, the event identification module 220 determines whether the current date or time matches or is within a threshold time interval of the start date or time associated with the first event. For example, the event identification module 220 determines whether the current date is the same as the start date of the first event or if the current date is within 3 days after the start date of the first event. In such circumstances, the event identification module 220 provides an identifier of the first event to the criteria module 211, to the content item selection module 250, and to the social event template graphic generation module 240.

As another example, the event identification module 220 retrieves a second event from the event list(s) 307. The second event may correspond to a quarantine order issued in a certain geographical region. The event identification module 220 determines that the current location of the client device matches or is within a threshold distance of the geographical location associated with the second event. In response, the event identification module 220 determines the start date of the second event. The event identification module 220 compares the current date to the start date and determines that the current date exceeds the start date of the second event by more than the predetermined time interval (e.g., 30 days). In response, the event identification module 220 provides an identifier of the second event to the criteria module 211, to the content item selection module 250, and to the social event template graphic generation module 240.

Figure 7:
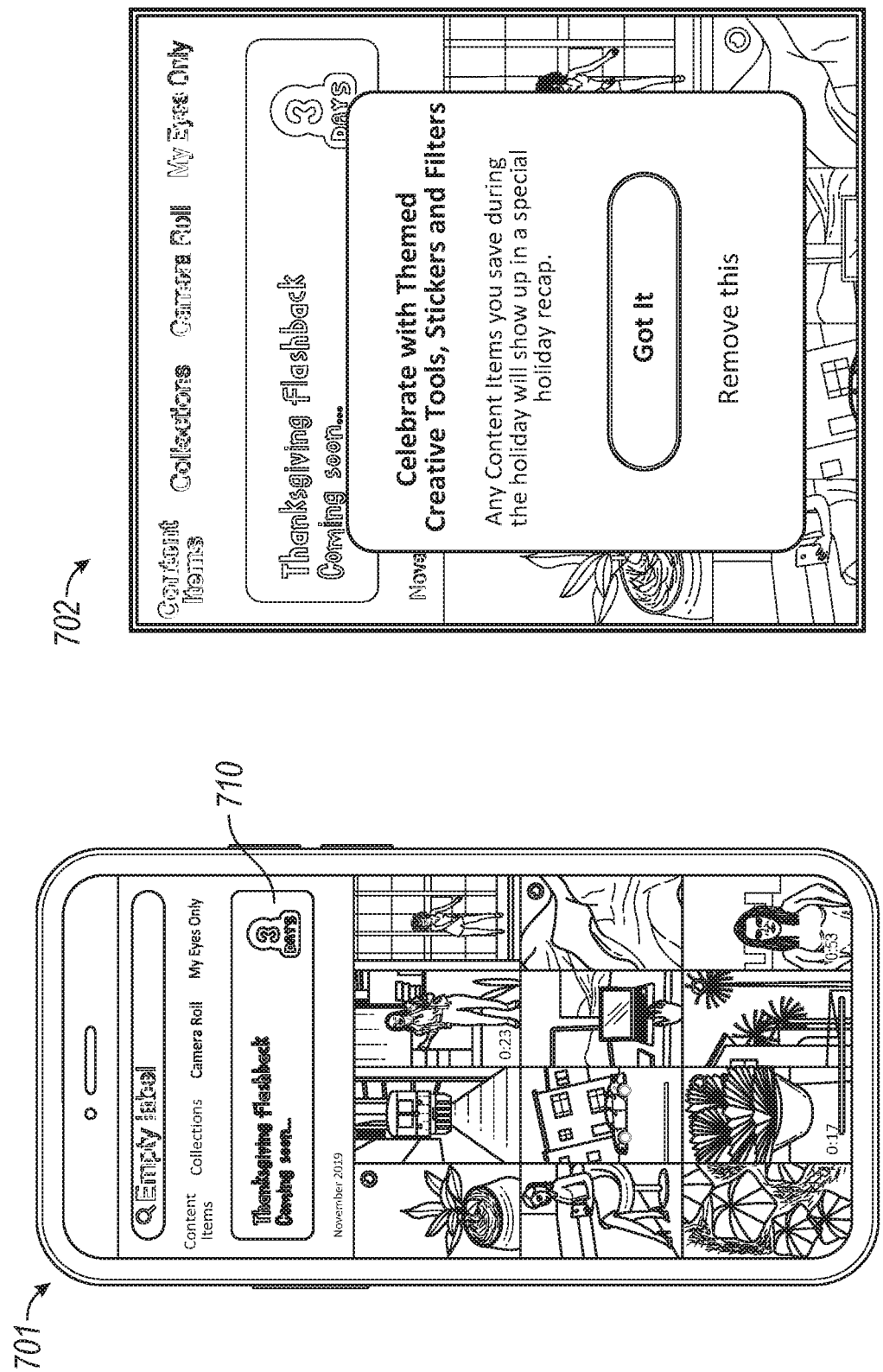

In some embodiments, the event identification module 220 compares the current date to the start date and determines that the current date precedes the start date of the second event by less than a predetermined time interval (e.g., 3 days). In response, the event identification module 220 provides an identifier of the second event to the social event card presentation module 230 with an indication that the second event is coming up in less than 3 days. The social event card presentation module 230 presents an identifier in the user interface of a messaging client 104 that informs the user about the automatic generation of a holiday card for the upcoming second event. The user can select the identifier to receive information about the automatic generation of the event. For example, as shown in FIG. 7, a user interface 701 of the messaging client 104 is presented. The user interface 701 includes an identifier 710 of a holiday or event (e.g., Thanksgiving) that is coming up soon (e.g., in less than 3 days). In response to receiving a user selection of the identifier 710, a user interface 702 is presented that includes a prompt. The prompt includes a message that informs the user that any content the user generates during the upcoming holiday can be used to automatically generate a holiday card (e.g., included in a special holiday recap).

Referring back to FIG. 5A, the criteria module 211 obtains one or more creative tools associated with the event identified by the event identification module 220. For example, the criteria module 211 accesses the event list(s) 307 to retrieve one or more criteria for selecting content items in relation to the first event. As one example, the criteria module 211 retrieves the date of the first event, a time range of the current social event, a location associated with the first event, a country associated with the first event, or a language associated with the first event. As another example, the criteria module 211 retrieves at least one of a caption including one or more words associated with the first event, a graphical element representative of the first event, or an augmented reality element associated with the first event. The criteria obtained by the criteria module 211 is provided to the content item selection module 250 to select content items that are used to generate a social event template graphic.

The content item selection module 250 accesses a collection of content that has been previously generated and stored by the client device 102. The content item selection module 250 obtains metadata associated with the collection of content and uses the criteria provided by the criteria module 211 to filter the collection of content into a filtered set of content items. For example, the content item selection module 250 removes content items from the collection of content that are associated with location data that does not match the location associated with the first event. As another example, the content item selection module 250 removes content items from the collection of content that are associated with a country (e.g., were captured in a particular country) that does not match the country associated with the first event. As another example, the content item selection module 250 removes content items from the collection of content that are associated with a language (e.g., including spoken words or written words in a first language) that does not match the second language associated with the first event. As another example, the content item selection module 250 removes content items from the collection of content that are associated with a date or timestamp that is beyond a threshold period of time (e.g., more than 3 days) before or after the start or end of the first event. Specifically, the content item selection module 250 ensures that only content items generated during the first event (or the identified event) are included in the filtered set of content items.

The content item selection module 250 analyzes the filtered set of content items to identify content items that were augmented or modified using one or more creative tools and to generate a subset of the content items that were filtered. For example, the content item selection module 250 accesses a first content item in the filtered set of content items and determines, based on the metadata of the first content item, whether one or more creative tools were applied to the first content item. Specifically, the content item selection module 250 determines whether a caption including one or more words, a graphical element, or an augmented reality element were used to enhance, modify, change, or augment the first content item after the first content item was captured or during capture of the first content item. The content item selection module 250 retrieves an identifier that describes the one or more creative tools that were applied to the first content item. The content item selection module 250 obtains the list of creative tools associated with the first event and determines whether the retrieved identifier matches one or more of the creative tools in the list of creative tools associated with the first event. In an example, each creative tool is associated with a unique identifier that is stored in the metadata of the content item that is captured and modified. The unique identifier is compared with the unique identifiers in the list of creative tools to determine whether the creative tool used to modify the content item matches one or more of the creative tools associated with the first event. For example, if the user captured an image during the Thanksgiving holiday and augmented the image with a word that includes "Thanksgiving" or a picture of a turkey, the content item selection module 250 determines that the image was augmented or modified using one or more creative tools associated with the first event the Thanksgiving holiday).

The content item selection module 250 generates a count value that represents how many of the filtered set of content items were augmented or modified using one or more creative tools associated with the first event. For example, if the user generated five content items (e.g., images and videos) that were augmented with creative tools specific to the first event, the count value may be five. The content item selection module 250 provides the subset of the content items and the count value to the social event template graphic generation module 240. In some implementations, the content item selection module 250 receives a minimum number of content items associated with the first event from the criteria module 211. The content item selection module 250 compares the count value to the received minimum number. In response to determining that the count value is less than the minimum number, the content item selection module 250 terminates the process of generating the holiday card. In response to determining that the count value is more than or equal to the minimum number, the content item selection module 250 instructs the social event template graphic generation module 240 to automatically populate a template graphic based on the subset of content items.

Figure 6:
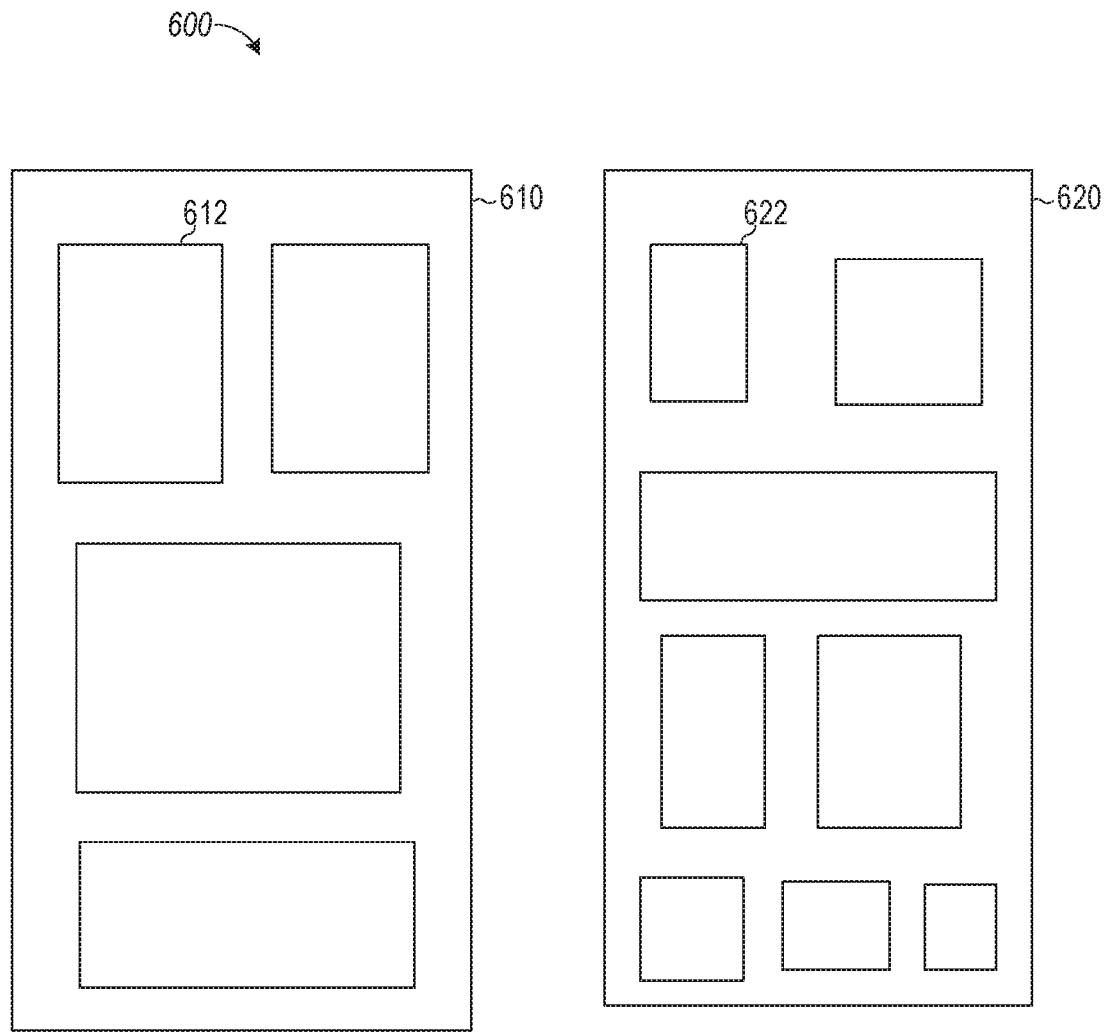
FIGS. 6-8 are illustrative user interfaces of the social event card generation platform, according to example embodiments.

The social event template graphic generation module 240 stores a plurality of social event template graphics associated with each of the events in the event list(s) 307. For example, the social event template graphic generation module 240 stores a first plurality of social event template graphics associated with the first event and a second plurality of social event template graphics associated with the second event. FIG. 6 shows illustrative social event template graphics 600 that are stored by the social event template graphic generation module 240. A first social event template graphic 610 includes a first set of slots 612 for inserting content items received from the content item selection module 250. The slots may be arranged in different ways and the slots can be of different sizes. Some slots may be in portrait image arrangements and some may be in landscape image arrangements. The first social event template graphic 610 includes one or more graphical elements that thematically represent the event associated with the first social event template graphic 610. A second social event template graphic 620 includes a second set of slots 622 for inserting content items received from the content item selection module 250. The second set of slots 622 may be greater in number than the first set of slots 612 so that many more content items can be populated into the second social event template graphic 610 than the first social event template graphic 610. The slots may be arranged in different ways and the slots can be of different sizes. Some slots may be in portrait image arrangements and some may be in landscape image arrangements. The second social event template graphic 620 includes one or more graphical elements that thematically represent the event associated with the second social event template graphic 620. The graphical elements of the social event template graphics 610 and 620 may be the same or different between the first and second social event template graphics 610 and 620.

Referring back to FIG. 5A, the social event template graphic generation module 240 selects one of the social event template graphics associated with the first event based on the count value provided by the content item selection module 250. For example, the social event template graphic generation module 240 compares the number of slots in each social event template graphic to the count value. The social event template graphic generation module 240 selects a social event template graphic that includes fewer slots or an equal number of slots as the count value. Specifically, the social event template graphic generation module 240 determines that the second social event template graphic 620 includes more slots than the count value. In such cases, the social event template graphic generation module 240 determines whether the first social event template graphic 610 includes a number of slots fewer than or that corresponds to the count value. For example, if the count value is five and there are four slots in the first social event template graphic 610, the social event template graphic generation module 240 selects the first social event template graphic 610. In some cases, the social event template graphic generation module 240 selects the social event template graphic that includes a number of slots greater than the count value by less than a threshold amount (e.g., fewer than two slots). Specifically, the social event template graphic generation module 240 selects a social event template graphic that includes five slots (less than two slots more) than the count value that is three.

The social event template graphic generation module 240 randomly or pseudo-randomly selects content items from the subset of content items sufficient to populate the slots in the selected social event template graphic. The social event template graphic generation module 240 randomly or pseudo-randomly places the selected content items in respective slots and formats, scales and resines the selected content items to fit into the respective slots. The social event template graphic generation module 240 randomly or pseudo-randomly selects an annotation that was applied to one or more of the content items and adds the selected annotation as an overlay on top of the populated template graphic. The social event template graphic generation module 240 randomly or pseudo-randomly selects one or more thematically relevant graphical elements (e.g., thematically relevant colors or images) to place on top of the social event template graphic. For example, the social event template graphic generation module 240 adds a turkey and autumn colors to a social event template graphic that is associated with the Thanksgiving holiday. The social event template graphic generation module 240 outputs a social event card (e.g., holiday card) that includes the populated and annotated social event template graphic to the social event card presentation module 230.

The social event card presentation module 230 presents an identifier of the holiday card (social event card) generated by the social event template graphic generation module 240 on a graphical user interface of the messaging client 104 of the client device 102. The social event card presentation module 230 retrieves a threshold period of time from the event list(s) 307 associated with the first event. The social event card presentation module 230 compares the current time or date with the start time or date of the first event. The social event card presentation module 230 determines that the current time or date exceeds the start time or date of the first event by a first amount. The social event card presentation module 230 compares the first amount with the threshold period of time. In response to determining that the first amount is less than the threshold period of time, the social event card presentation module 230 maintains the identifier in the display of the messaging client 104. In response to determining that the first amount is more than the threshold period of time, the social event card presentation module 230 removes the identifier from the display of the messaging client 104 to prevent the user from sharing or accessing the social event card.

The social event card presentation module 230 receives a user selection of the displayed identifier from the messaging client 104. In response, the social event card presentation module 230 presents the holiday card (e.g., social event card) to the user. The social event card presentation module 230 provides an option to specify a list of recipients and an option to modify the social event card. For example, the user can rearrange, remove, or add graphical elements and content items to the social event card. The user can also add new annotations to the social event card. The user can select the option to specify the list of recipients or an option to send to all of the user's friends and, in response, the social event card presentation module 230 sends the holiday card to the specified list of recipients for display on their respective client devices 102.

Figure 5B:
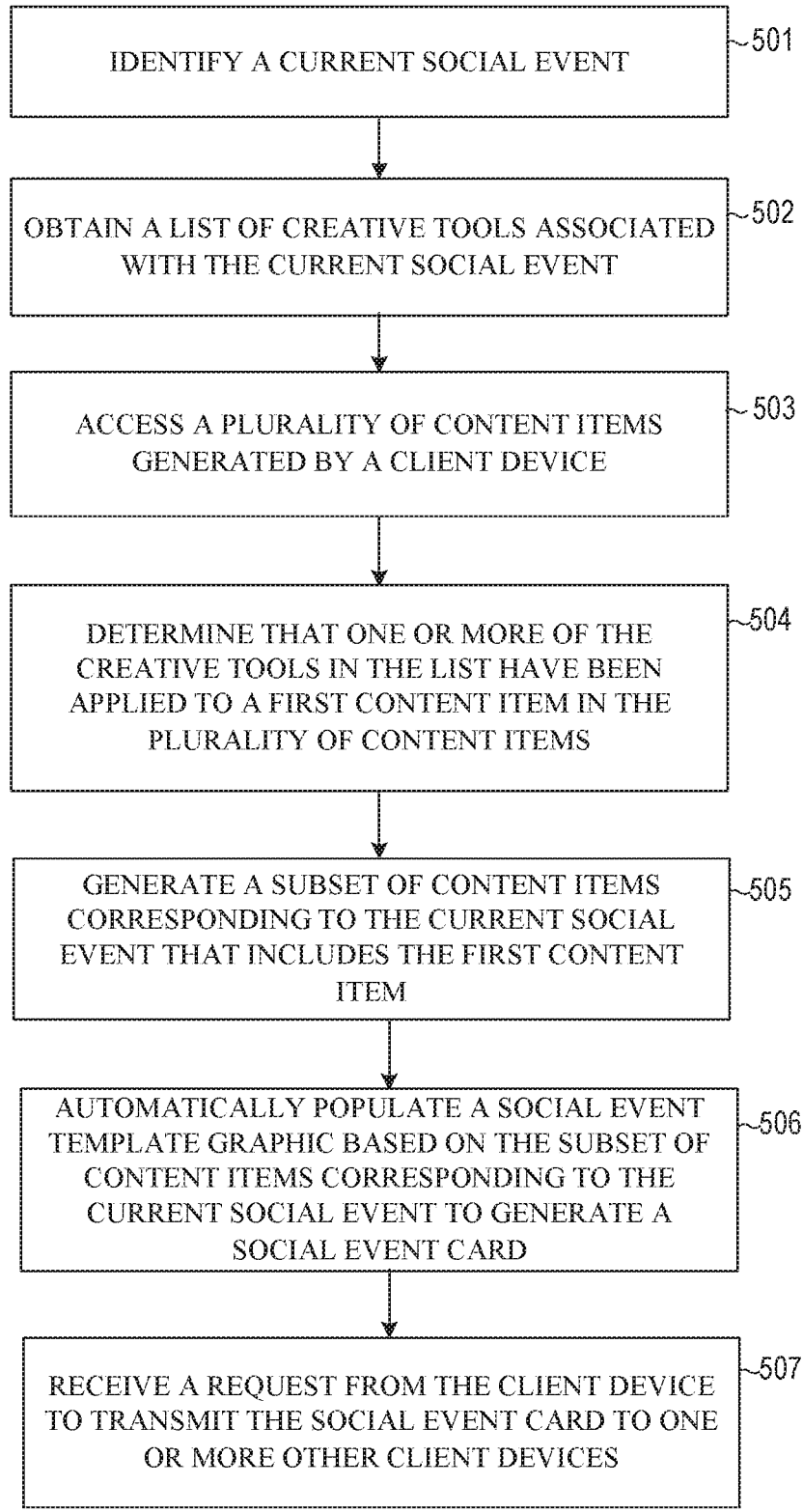
FIG. 5B is a flowchart illustrating example operations of the social event card generation platform, according to example embodiments.

FIG. 5B is a flowchart illustrating example operations of the social event card generation platform 126 in performing process 500, according to example embodiments. The process 500 may be embodied in computer-readable instructions for execution by one or more processors such that the operations of the process 500 may be performed in part or in whole by the functional components of the messaging server system 108; accordingly, the process 500 is described below by way of example with reference thereto. However, in other embodiments at least some of the operations of the process 500 may be deployed on various other hardware configurations. The process 500 is therefore not intended to be limited to the messaging server system 108 and can be implemented in whole, or in part, by any other component. The operations in the process 500 can be performed in any order, in parallel, or may be entirely skipped and omitted.

At operation 501, the social event card generation platform 126 identifies a current social event. For example, when the event identification module 220 determines that the current geographical region of the client device 102 is within a predetermined range of the geographical region associated with the first event and the current date or time matches or is within a threshold time interval of the start date or time associated with the first event, the event identification module 220 identifies the first event as the current social event (e.g., an event that is currently occurring or has recently occurred).

At operation 502, the social event card generation platform 126 obtains a list of creative tools associated with the current social event. For example, the criteria module 211 retrieves at least one of a caption including one or more words associated with the first event, a graphical element representative of the first event, or an augmented reality element associated with the first event.

At operation 503, the social event card generation platform 126 accesses a plurality of content items generated by a client device. For example, the content item selection module 250 accesses a collection of content that has been previously generated and stored by the client device 102.

At operation 504, the social event card generation platform 126 determines that one or more of the creative tools in the list have been applied to a first content item in the plurality of content items. For example, the content item selection module 250 analyzes the collection of content items to identify content items that were augmented or modified using one or more creative tools and to generate a subset of the content items. Specifically, the content item selection module 250 determines whether a caption including one or more words, a graphical element, or an augmented reality element were used to enhance, modify, change or augment the first content item after the first content item was captured or during capture of the first content item.

At operation 505, the social event card generation platform 126 generates a subset of content items corresponding to the current social event that includes the first content item. For example, the content item selection module 250 includes content items that were augmented or modified using one or more creative tools in a subset of the content items corresponding to the first event.

At operation 506, the social event card generation platform 126 automatically populates a social event template graphic based on the subset of content items corresponding to the current social event to generate a holiday card. For example, the social event template graphic generation module 240 selects a social event template graphic from a plurality of social event template graphics associated with the first event and randomly or pseudo-randomly selects content items from the subset of content items sufficient to populate the slots in the selected social event template graphic.

At operation 507, the social event card generation platform 126 receives a request from the client device to transmit the holiday card to one or more other client devices. For example, the social event card presentation module 230 presents an identifier of the holiday card generated by the social event template graphic generation module 240 on a graphical user interface of the messaging client 104 of the client device 102 and provides an option for a user to specify a list of recipients to whom to send the holiday card.

Figure 8:
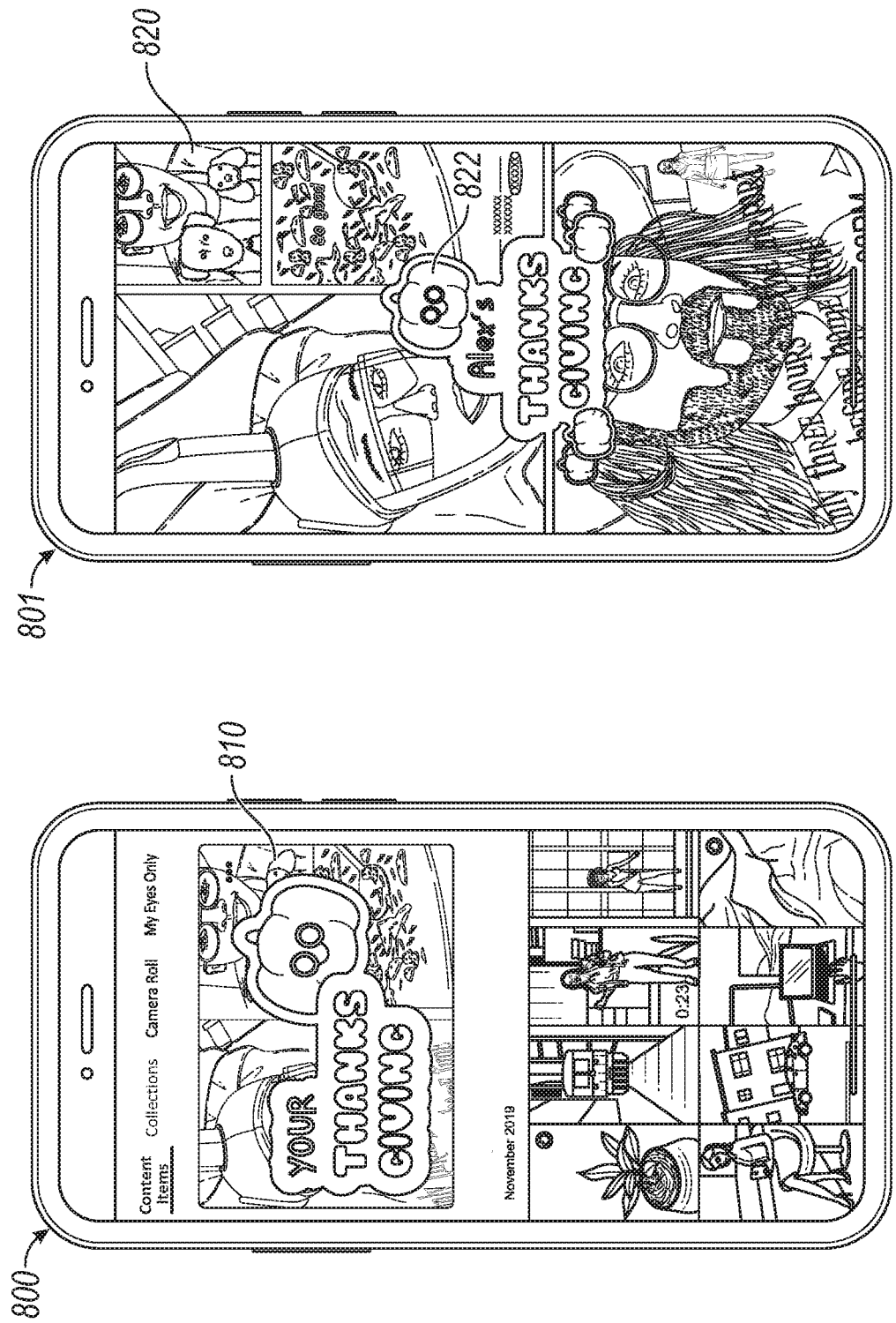

FIG. 8 is an illustrative user interface of the holiday card generation platform, according to example embodiments. Specifically, user interface 800 of FIG. 8 includes an identifier 810 of a holiday card associated with a first event Thanksgiving). The identifier 810 remains presented in the user interface 800 for a specified threshold period of time after the start time or date of the first event. For example, the identifier 810 continues to be presented in the user interface 800 for three days after the first event started. In some cases, the identifier 810 is for a second event and remains presented for a different amount of time (e.g., for seven days after the second event started). The amount of time for which the identifier 810 is displayed is based on the type of the event or popularity or importance of the event.

In response to receiving a user selection of the identifier 810, the social event card generation platform 126 presents the holiday card 801 that was automatically generated. The holiday card 801 includes content items 820 that were captured, stored and augmented with creative tools associated with the first event. The holiday card 801 also includes one or more graphical elements 822 that are thematically relevant to the first event. An option (not shown) is presented to allow the user to share the holiday card with one or more other designated recipients, Another option (not shown) is presented to allow the user to modify or add items to the holiday card 801.

Machine Architecture

Figure 9:
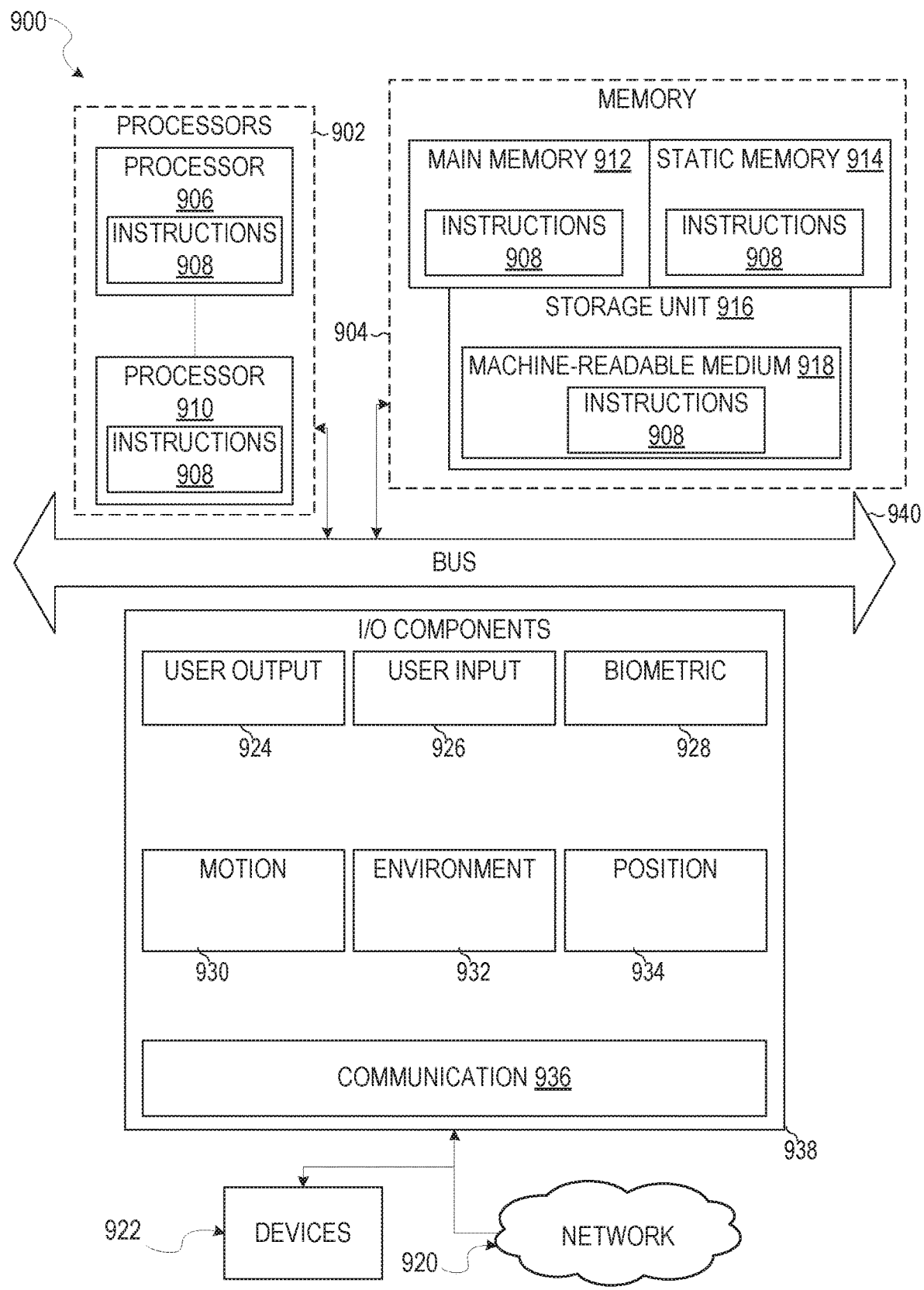
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described.

The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body, gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCOde, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
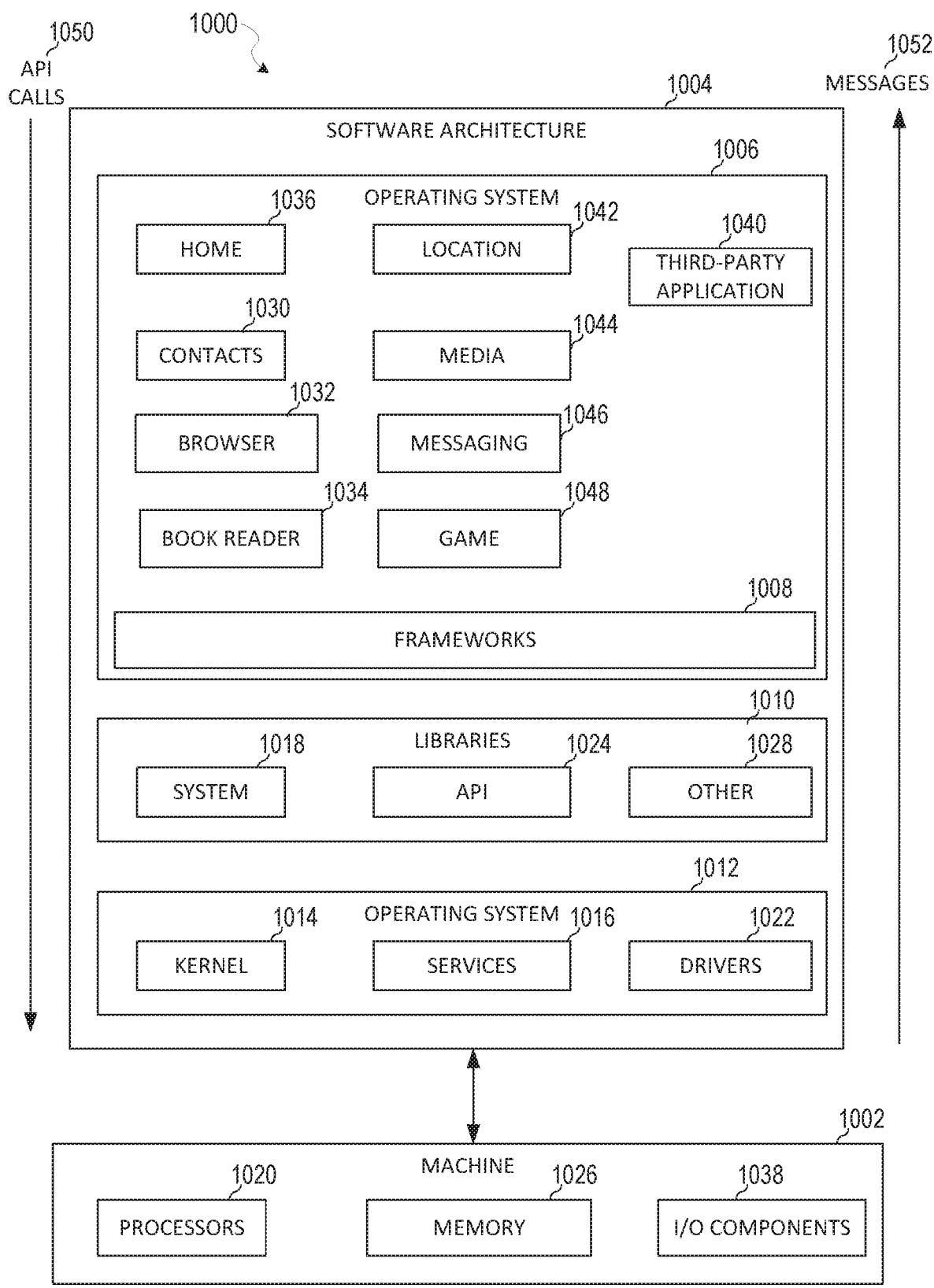
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API), The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm), in other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    identifying, by one or more processors, a current social event;
    obtaining a list of creative tools associated with the current social event;
    accessing a plurality of content items generated by a client device;
    determining that one or more of the creative tools in the list have been applied to a first content item in the plurality of content items;
    in response to determining that one or more of the creative tools in the list have been applied to the first content item, generating a subset of content items corresponding to the current social event that includes the first content item;
    automatically populating a social event template graphic based on the subset of content items corresponding to the current social event to generate a social event graphic card; and
    receiving a request from the client device to transmit the social event graphic card to one or more other client devices.

2. The method of claim 1, wherein the current social event is New Years Eve, Christmas Eve, Christmas Day, a holiday celebrated worldwide, an event celebrated worldwide, an event celebrated in a particular region, Easter, Good Friday, Hanukkah, a religious holiday, a national state of emergency, a quarantine order in the particular region, or a secular holiday.

3. The method of claim 1, wherein the current social event has occurred previously within a threshold period of time or is presently occurring.

4. The method of claim 3, wherein the threshold period of time comprises a time period that is dependent on an attribute associated with the event.

5. The method of claim 1, further comprising filtering the plurality of content items prior to generating the subset of content items based on one or more criteria associated with the current social event.

6. The method of claim 5, wherein the one or more criteria comprises at least one of a date of the current social event, a time range of the current social event, a location associated with the current social event, a country associated with the current social event, or a language associated with the current social event.

7. The method of claim 1, wherein the list of creative tools comprises at least one of a caption including one or more words associated with the current social event, a graphical element representative of the current social event, or an augmented reality element associated with the current social event.

8. The method of claim 1, further comprising:
    determining a number of content items that are included in the subset of content items; and
    selecting the social event template graphic from a plurality of social event template graphics based on the number of content items that are included in the subset of content items.

9. The method of claim 8, further comprising:
    determining that the subset of content items is sufficient to fill a first quantity of a first social event template graphic of the plurality of social event template graphics;
    determining that the first quantity is less than a threshold;
    determining that the subset of content items is sufficient to fill a second quantity of a second social event template graphic of the plurality of social event template graphics; and
    in response to determining that the second quantity is greater than or equal to the threshold, selecting, as the social event template graphic, the second social event template graphic.

10. The method of claim 1, further comprising:
    determining that the social event template graphic includes a greater number of content item slots than a number of content items that are included in the subset of content items;
    populating a first group of the content item slots with the subset of the content items; and
    populating a second group of the content item slots with thematically relevant content associated with the current social event.

11. The method of claim 1, further comprising randomly or pseudo-randomly selecting content items from the plurality of content items for inclusion in the subset of content items.

12. The method of claim 1, further comprising:
    causing an identifier of the social event template graphic to be presented on the client device; and
    transmitting the social event template graphic to the one or more other client devices in response to receiving a user selection of the identifier.

13. The method of claim 12, further comprising removing the identifier after a threshold period of time has elapsed since a start of the current social event.

14. The method of claim 1, wherein the current social event is identified in response to determining that a quarantine order is terminated or when a national state of emergency is declared to be over.

15. The method of claim 1, further comprising:
    determining that less than a threshold number of the one or more of the creative tools in the list has been applied to one or more content items in the plurality of content items; and
    in response to determining that less than the threshold number of the one or more of the creative tools in the list has been applied to the one or more content items, preventing populating the social event template graphic.

16. The method of claim 15, wherein the threshold number is adjusted based on a type of the current social event or based on historical information indicative of how many users applied the one or more creative tools to content items on a previous occurrence of the current social event.

17. The method of claim 15, wherein the threshold number is adjusted based on a measure of how active a user associated with the client device is on a messaging application platform.

18. The method of claim 1, further comprising notifying a user of the client device about generation of the social event template graphic before the current social event begins.

19. A system comprising:
a processor configured to perform operations comprising:
- identifying a current social event;
- obtaining a list of creative tools associated with the current social event;
- accessing a plurality of content items generated by a client device;
- determining that one or more of the creative tools in the list have been applied to a first content item in the plurality of content items;
- in response to determining that one or more of the creative tools in the list have been applied to the first content item, generating a subset of content items corresponding to the current social event that includes the first content item;
- automatically populating a social event template graphic based on the subset of content items corresponding to the current social event to generate a social event graphic card; and
- receiving a request from the client device to transmit the social event graphic card to one or more other client devices.

20. A non-transitory machine-readable storage medium that includes instructions that, when executed by one or more processors of a machine, cause the machine to perform operations comprising:
- identifying a current social event;
- obtaining a list of creative tools associated with the current social event;
- accessing a plurality of content items generated by a client device;
- determining that one or more of the creative tools in the list have been applied to a first content item in the plurality of content items;
- in response to determining that one or more of the creative tools in the list have been applied to the first content item, generating a subset of content items corresponding to the current social event that includes the first content item;
- automatically populating a social event template graphic based on the subset of content items corresponding to the current social event to generate a social event graphic card; and
- receiving a request from the client device to transmit the social event graphic card to one or more other client devices.

* * * * *